UNITED STATES PATENT OFFICE.

GUSTAV MÖLLER, OF BERLIN, GERMANY.

PROCESS OF FORMING PIECES OF RAW CEMENT.

SPECIFICATION forming part of Letters Patent No. 678,748, dated July 16, 1901.

Application filed April 16, 1901. Serial No. 56,162. (No specimens.)

*To all whom it may concern:*

Be it known that I, GUSTAV MÖLLER, civil engineer, chemist, and manufacturer, a subject of the Emperor of Germany, residing at Friedrich Wilhelmstrasse 19, Berlin, Germany, have invented certain new and useful Improvements in Processes of Forming Raw Cement in Pieces or Blocks; and I do hereby declare the following to be a full, clear, and exact description of the invention, such as will enable others skilled in the art to which it appertains to make and use the same.

In the manufacture of cement what is usually called "raw" cement is produced in a plastic mass by mixing the other ingredients with water, and it has heretofore been found necessary to form or mold this plastic mass into solid blocks somewhat resembling bricks, which are afterward baked in an oven or kiln. Usually this plastic mass is formed into bricks and baked thereafter by a process similar to that of the manufacture of bricks of clay or loam, so that the cement bricks first undergo a drying process and afterward are baked in a kiln. This way of manufacture is a toilsome and expensive one, as it requires an expensive apparatus as well as the services of numerous workmen. Besides that, the form of bricks is not always the most suitable one, especially not if a so-called "pit-kiln" is used for the baking process. A form resembling somewhat that of a globe is far more preferable, because objects of such a shape possess a higher solidity and cannot so easily be chipped off or lose fragments, as pieces in the form of bricks will do on their sharp edges and corners.

This invention is intended to remove all these inconveniences and provides a process for the manufacture of dry and larger pieces of raw cement which are ready to immediately undergo the baking process.

It is a well-known fact that small pieces of dry cement if brought into contact with plastic cement mass will absorb water vigorously and increase in size by gathering the material about them and surrounding themselves with a layer of raw cement, and this is the fact this new process is based on. The small fragments of dry cement which are formed inside of a drying-box (which box can have the shape of a drum) are gathered in and brought a second time into contact with plastic cement mass in such a way that they will encompass themselves a second time with a layer of the mass, and so grow more voluminous every time this procedure is repeated. This can be effected in the following way: The small pieces of dry cement which leave the drying apparatus are carried back to the entrance of said apparatus by means of any desired kind of transportation, and so undergo a second time the process of enveloping and drying, which can be repeated as often as it is necessary to give those pieces any desired volume. Sieves are employed to separate the pieces big enough for the baking process from those which will have to undergo the enveloping and drying process once more.

A second way to perform this process is the following: The drying-drums are constructed one behind the other, so that the small pieces in leaving the first one drop into the second, which simultaneously is supplied with fresh plastic mass, and so on, that as many of these drying apparatuses may be employed as are necessary to give the pieces any dried volume.

The same process can further be performed within one apparatus, so that the fresh plastic mass is brought in through several openings, so that the pieces forming themselves at the first opening from there are carried to the second to undergo there the surrounding and drying process, and from there to the third, and so on, until they have the desired size. Another way to perform the same operation is the following: Fixed or movable planes or other objects are used, on top of which the first layer of cement mass will dry and which after fresh mass is applied will grow bigger and bigger until any desired size is obtained, whereby it is indifferent whether these objects are heated from inside or are exposed to a draft of warm air on their outside, so that the process, if desired, can be performed continually.

Having thus fully described the invention, what is claimed as new is—

1. The herein-described process for the manufacture of solid pieces of raw cement which consists in drying the plastic raw cement and successively bringing pieces of said dried cement into contact with newly-mixed plastic mass, thus surrounding said pieces with a new layer of the mass at each operation until the pieces have reached the desired size and are ready for the baking process.

2. The herein-described process for the manufacture of solid pieces of raw cement which consists in drying the plastic raw cement and successively bringing pieces of said dried cement into contact with newly-mixed plastic mass, thus surrounding said pieces with a new layer of the mass at each operation drying the pieces sufficiently after each operation to permit of sifting them, and finally submitting the pieces which have attained the required size to the baking process.

3. The improvement in the process, herein described, for the manufacture of solid pieces of raw cement, which consists in permitting dried pieces of the cement to pass successively through a series of drying-drums each of which contains a plastic mass of raw cement with which the pieces of cement are successively brought into contact until they are passed through the whole series of drying-drums and finally submitting the pieces which have attained the desired size to the baking process.

In testimony whereof I affix my signature in presence of two witnesses.

GUSTAV MÖLLER.

Witnesses:
WOLDEMAR HAUPT,
HENRY HASPER.